(12) United States Patent
Chun et al.

(10) Patent No.: US 12,640,420 B2
(45) Date of Patent: May 26, 2026

(54) ALUMINUM POUCH FILM FOR SECONDARY BATTERY, AND METHOD FOR MANUFACTURING SAME

(71) Applicant: SBTL ADVANCED MATERIALS CO., LTD., Hwaseong-si (KR)

(72) Inventors: Sang Wook Chun, Hwaseong-si (KR); Jun Ho Shim, Seoul (KR); Soon Sik Lee, Cheongju-si (KR)

(73) Assignee: SBTL ADVANCED MATERIALS CO., LTD., Hwaseong-si (KR)

( * ) Notice: Subject to any disclaimer, the term of this patent is extended or adjusted under 35 U.S.C. 154(b) by 514 days.

(21) Appl. No.: 18/274,830

(22) PCT Filed: Jan. 28, 2022

(86) PCT No.: PCT/KR2022/001575
§ 371 (c)(1),
(2) Date: Jul. 28, 2023

(87) PCT Pub. No.: WO2022/164255
PCT Pub. Date: Aug. 4, 2022

(65) Prior Publication Data
US 2024/0145823 A1 May 2, 2024

(30) Foreign Application Priority Data

Feb. 1, 2021 (KR) ........................ 10-2021-0014130

(51) Int. Cl.
*H01M 50/129* (2021.01)
*H01M 50/105* (2021.01)
(Continued)

(52) U.S. Cl.
CPC ....... *H01M 50/129* (2021.01); *H01M 50/105* (2021.01); *H01M 50/119* (2021.01); *H01M 50/121* (2021.01); *H01M 50/126* (2021.01)

(58) Field of Classification Search
CPC ............. H01M 50/105; H01M 50/119; H01M 50/121; H01M 50/124; H01M 50/1243;
(Continued)

(56) References Cited

U.S. PATENT DOCUMENTS

2007/0207379 A1* 9/2007 Hatta .................... H01M 10/48
383/109
2014/0234689 A1 8/2014 Kim et al.
2014/0377636 A1 12/2014 Sung et al.

FOREIGN PATENT DOCUMENTS

EP 4 266 459 A1 10/2023
JP 2014-527687 A 10/2014
(Continued)

OTHER PUBLICATIONS

Clarivate Analytics machine translation of KR 10-2016-0077968 A (Year: 2016).*
(Continued)

*Primary Examiner* — Kevin E Yoon
(74) *Attorney, Agent, or Firm* — Sughrue Mion, PLLC

(57) ABSTRACT

An aluminum pouch film for a secondary battery and a method for manufacturing the aluminum pouch film are disclosed. The aluminum pouch film contains an aluminum layer; an outer resin layer formed on the first surface of the aluminum layer; a first adhesive layer for bonding the aluminum layer and the outer resin layer; an inner resin layer formed on the second surface of the aluminum layer; and a second adhesive layer for bonding the aluminum layer and the inner resin layer. The inner resin layer includes a compound formed by chemically bonding a fluoropolymer resin, a polyolefin, and a functional resin.

4 Claims, 1 Drawing Sheet

(51) Int. Cl.
   *H01M 50/119*       (2021.01)
   *H01M 50/121*       (2021.01)
   *H01M 50/126*       (2021.01)

(58) Field of Classification Search
   CPC .......... H01M 50/1245; H01M 50/126; H01M
   50/129
   See application file for complete search history.

(56)                 References Cited

FOREIGN PATENT DOCUMENTS

| | | | |
|---|---|---|---|
| JP | 2019-172936 | A | 10/2019 |
| JP | 2020-164755 | A | 10/2020 |
| KR | 10-2013-0081446 | A | 7/2013 |
| KR | 10-2016-0077968 | A | 7/2016 |
| KR | 10-2018-0086143 | A | 7/2018 |
| KR | 10-2019359 | B1 | 9/2019 |

OTHER PUBLICATIONS

International Search Report for PCT/KR2022/001575 dated May 16, 2022.
Extended European Search Report dated Dec. 4, 2024 in Application No. 22746281.9.

* cited by examiner

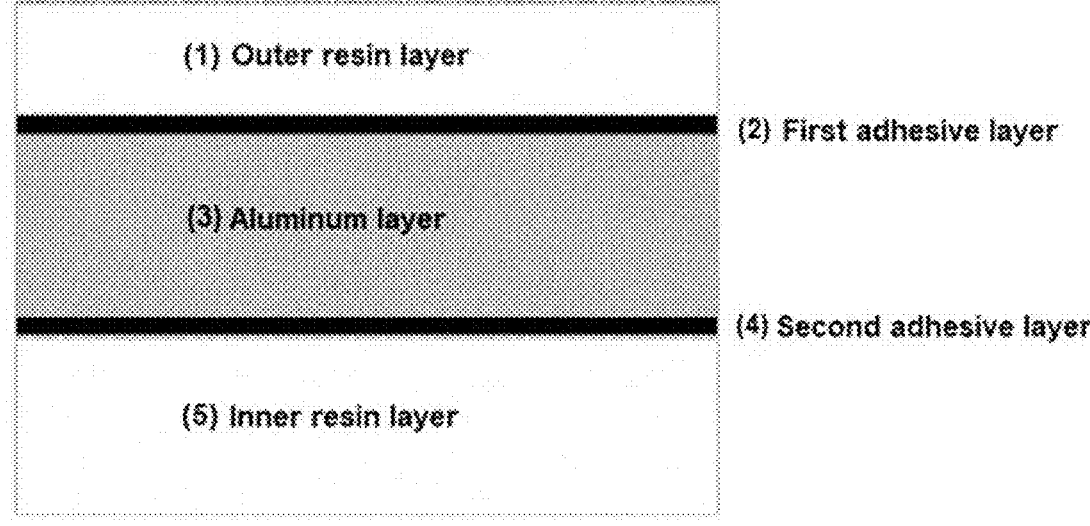

ALUMINUM POUCH FILM FOR SECONDARY BATTERY, AND METHOD FOR MANUFACTURING SAME

CROSS REFERENCE TO RELATED APPLICATIONS

This application is a National Stage of International Application No. PCT/KR2022/001575 filed Jan. 28, 2022, claiming priority based on Korean Patent Application No. 10-2021-0014130 filed Feb. 1, 2021.

TECHNICAL FIELD

The present invention relates to an aluminum pouch film for a secondary battery and a method for manufacturing the same, and more particularly, to an aluminum pouch film for a secondary battery having significantly improved heat resistance and moldability compared to the exterior material used in conventional secondary batteries and a method for manufacturing the same.

BACKGROUND ART

Recently, the secondary battery, an electrochemical device used to supply power to various electronic and electrical products usually refers to a lithium secondary battery, which has a high molecular polymer electrolyte and generates current through the movement of lithium ions. As an exterior material for packaging to protect this secondary battery, a pouch for a secondary battery is used. This pouch for a secondary battery protects a battery cell made of the electrode assembly and an electrolyte solution filled inside by a subsequent process and is composed of a form in which an aluminum thin film is interposed in order to stably maintain the electrochemical properties of the battery cell. In this pouch film, polyethylene terephthalate (PET) resin, nylon, etc. are formed as an external resin layer on the aluminum thin film in order to protect the battery cell from external impact.

The pouch is formed by bonding the upper pouch and the lower pouch at the outer circumference by thermal fusion, etc., wherein an adhesive layer made of polyolefin such as polyethylene (PE) or polypropylene (PP) or a copolymer thereof is formed between the lower surface of the upper pouch and the upper surface of the lower pouch to bond the interfaces between each other.

The pouch film is generally composed of a predetermined layered structure having an inner resin layer in direct contact with the electrolyte, a second adhesive layer, an aluminum layer, a first adhesive layer, and an outer resin layer in direct contact with the outside in the listed order.

The pouch-type secondary battery having the above structure may be damaged for various reasons in various processes. For example, in the process of accommodating the electrode assembly in the pouch, protrusions such as electrode tabs or electrode leads cause damage such as cracks in the inner PP or CPP layer of the pouch, and thus the aluminum layer can be exposed due to such damage.

In addition, when sealing the pouch, heat is applied from the outside, and fine pin-holes are generated by this heat or the pouch is internally damaged, thereby causing cracks in the inner adhesive layer and thus causing the aluminum layer to be exposed to an electrolyte or the like.

In addition to the above reasons, the adhesive layer formed in the form of a thin film may be damaged due to dropping, impact, pressure, or compression, and thus, through the damaged area of the adhesive layer, the aluminum layer is exposed to the electrolyte or the like.

The aluminum layer exposed to the electrolyte solution can be corroded as the electrolyte solution that penetrates or diffuses into the battery causes a chemical reaction with oxygen or moisture. Through this, a corrosive gas is generated, and thus, there is a problem that a swelling phenomenon that expands the inside of the battery occurs.

More specifically, $LiPF_6$ may react with water and oxygen to produce hydrofluoric acid (HF), a corrosive gas. This hydrofluoric acid may react with aluminum to cause a rapid exothermic reaction, and when it is adsorbed on the aluminum surface by a secondary reaction and thus penetrates into the tissue, the brittleness of the tissue increases, and thus cracks in the pouch film can occur even in micro impacts. In this case, due to the leakage of the electrolyte solution, lithium and the atmosphere react, and thus ignition may occur.

Therefore, in order to prevent contact with aluminum even if corrosive hydrofluoric acid is generated as described above, various techniques for modifying the surface of aluminum are being studied. Examples of techniques for modifying the surface of aluminum include heat treatment, other chemical conversion treatments, sol-gel coating, primer treatment, corona treatment, plasma treatment, and the like.

However, recently, since the secondary battery is gradually becoming larger in capacity, the forming depth of the pouch film is also increasing. If the forming depth is increased to increase the capacity, a large amount of slip agent is prescribed on the inner resin layer to maintain the slip properties in the mold, in the case of a multi-layer film made of polymer, metal and polymer. In the case of such an inner resin layer containing a large amount of the slip agent, if a certain period of time has elapsed, the slip agent migrates from the inside of the resin layer to the surface, thereby forming a residue in the mold. The residue left in the mold then remains as a foreign substance inside the battery after the battery is fabricated because the inner resin layer is attached to the surface. The slip agent that has flowed into the battery reacts with the electrolyte solution for a long time and reduces the activity of the electrolyte solution to shorten the expected lifetime of the battery, or it may flow into the pores of the separator and cause an accident such as an explosion of the battery due to overheating during charging and discharging.

In order to prevent these problems, various improvement technologies are being researched, and specifically, as in Korean Laid-open Patent Publication No. 10-2016-0077968, a multi-layered laminate sheet comprising polyolefin and fluoropolymer resin layers through a lamination process was developed. However, due to the recent trend of increasing the capacity of mobile and medium-to-large-sized batteries, the moldability of the pouch film is required to be increased. If the moldability of laminated multilayer films is increased to increase capacity, due to the characteristics of polymers having different modulus and strain, delamination occurs without overcoming the limit moldability between interfaces.

As such, since conventional technologies have limitations in solving the above problems, the need for improvement of aluminum pouch films for secondary batteries with excellent heat resistance, electrolyte solution resistance, releasability and moldability, especially polyolefin-based films used as inner layers, is continuously emerging.

(Patent Document 1) Korea Laid-open Patent Publication No. 10-2016-0077968 (Jul. 4, 2016), "Polyolefin Film, the Aluminum pouch film comprising the same, and the Secondary Battery comprising the same"

DISCLOSURE

Technical Problem

In order to solve the above problems, it is an object of the present invention to provide a method for manufacturing an aluminum pouch film for a secondary battery, which can secure excellent moldability without prescribing a conventional slip agent while continuously maintaining the heat resistance of the pouch film and thereby suppressing thermal deformation of the internal adhesive resin layer, even if the aluminum pouch film is continuously exposed to heat transferred and accumulated from an external natural environment to the inside and internal latent heat generated during internal charging and discharging.

Technical Solution

According to a first aspect of the present invention,
the present invention provides an aluminum pouch film for a secondary battery comprising an aluminum layer; an outer resin layer formed on a first surface of the aluminum layer; a first adhesive layer for bonding the aluminum layer and the outer resin layer; an inner resin layer formed on a second surface of the aluminum layer; and a second adhesive layer for bonding the aluminum layer and the inner resin layer, wherein the inner resin layer comprises a compound formed by chemically bonding a fluoropolymer resin, a polyolefin, and a functional resin.

In one embodiment of the present invention, the inner resin layer includes a compound formed by chemically bonding 3 to 18% by weight of fluoropolymer resin, 70 to 95% by weight of polyolefin and 1 to 15% by weight of functional resin, based on the total weight of the inner resin layer.

In one embodiment of the present invention, the fluoropolymer resin includes one selected from the group consisting of polyvinyl fluoride, polyvinylidene fluoride, polytrifluoroethylene, polytetrafluoroethylene, and combinations thereof.

In one embodiment of the present invention, the polyolefin is polyethylene (PE), polypropylene (PP), or a copolymer thereof.

In one embodiment of the present invention, the functional resin is maleic anhydride polypropylene (MAPP).

According to a second aspect of the present invention,
the present invention provides a method for manufacturing an aluminum pouch film for a secondary battery comprising the steps of a) preparing an aluminum layer, b) forming an outer resin layer on the first surface of the aluminum layer, c) preparing an inner resin layer containing a compound formed by chemically bonding a fluoropolymer resin, a polyolefin, and a functional resin; and d) bonding the inner resin layer to the second surface of the aluminum layer.

Advantageous Effects

When the aluminum pouch film for a secondary battery according to the present invention is used, even if exposed to continuous inner/outer thermal stress environment, delamination can be prevented by suppressing thermal deformation of the inner adhesive layer of the pouch, and since the aluminum layer can prevent a chemical reaction with the electrolyte solution, it is possible to reduce the risk of gas being generated inside the battery to expand the inside of the battery or explode due to high temperature. In addition, since micro cracks can be prevented due to the surface having a low friction coefficient during cold forming at room temperature, it is desirable for large-sized batteries for mass production of large-capacity batteries, which are essential for electric vehicles or energy storage devices, and can improve the safety of batteries for the environment.

DESCRIPTION OF DRAWINGS

The FIGURE is a schematic diagram showing the structure of the aluminum pouch film for a secondary battery according to a preferred embodiment of the present invention.

BEST MODE

Hereinafter, the present invention will be described in detail with reference to the accompanying drawings for an embodiment of the present invention so that those of ordinary skill in the art can easily carry out the present invention. However, the present invention may be embodied in many different forms and is not limited to the embodiments described herein. In addition, the same reference numerals in the drawings refer to the same components, and the size or thickness of each component may be exaggerated for convenience of explanation.

In the present specification, when a member is said to be located "on" another member, this comprises not only a case where a member is in contact with another member, but also a case where another member exists between the two members.

In the present specification, when a part is said to "comprise" a certain component, it means that it may further comprise other components, not excluding other components unless otherwise stated.

Hereinafter, preferred embodiments of the present invention will be described in detail with reference to the accompanying drawings.

The present invention provides an aluminum pouch film for a secondary battery comprising an aluminum layer, an outer resin layer formed on the first surface of the aluminum layer, a first adhesive layer for bonding the aluminum layer and the outer resin layer, an inner resin layer formed on the second surface of the aluminum layer, and a second adhesive layer for bonding the aluminum layer and the inner resin layer, wherein the inner resin layer comprises a compound formed by chemically bonding a fluoropolymer resin, a polyolefin, and a functional resin.

Hereinafter, each component of the aluminum pouch film for a secondary battery of the present invention will be described in detail.

Aluminum Layer

In the film for a packaging material of a secondary battery of the present invention, the material of the metal thin film used as a barrier layer to prevent the penetration of oxygen or moisture from the outside is preferably aluminum or an aluminum alloy. As an aluminum alloy, an alloy or a stainless alloy obtained by adding various metals and non-metals to pure aluminum may be used. As the aluminum layer, a soft aluminum foil can be preferably used, and more preferably, an aluminum foil containing iron is used to impart moldability to the aluminum foil. The aluminum foil is preferably a 1000 series or 8000 series aluminum alloy foil because a high-purity series has excellent workability. In addition, the aluminum substrate may optionally be an alloy containing an element selected from the group consisting of silicon, boron, germanium, arsenic, antimony, copper, magnesium, manganese, zinc, lithium, iron, chromium, vanadium, titanium, bismuth, potassium, tin, lead, zirconium, nickel, cobalt and combinations thereof. In the aluminum foil containing iron, iron may be contained in an amount of preferably 0.1 to 9.0% by mass, more preferably 0.5 to 2.0% by mass, based on 100 mass of the total aluminum foil. If the iron content of the aluminum foil is less than 0.1% by mass, the ductility of the aluminum layer is deteriorated, and if the iron content of the aluminum foil exceeds 9.0% by mass, there is a problem that the moldability is lowered. For the aluminum foil used for the aluminum layer, it is possible to etch or degrease the surface to improve adhesive properties with the inner resin layer, but it can be omitted to reduce the process speed. The aluminum layer is to prevent gas and water vapor from penetrating into the battery from the outside, and it is necessary that the aluminum thin film does not have pinholes and processability (pouching and embossing). The thickness is preferably 10 to 100 μm, more preferably 30 to 50 μm, in consideration of processability, oxygen and moisture barrier properties, and the like. If the above range is not satisfied, that is, if the thickness is less than 10 μm, there is a problem that the aluminum layer is easily torn, and the electrolytic resistance and insulation properties are deteriorated. In addition, if the thickness exceeds 50 μm, the moldability is deteriorated.

Outer Resin Layer

In the aluminum pouch film for a secondary battery of the present invention, since the outer resin layer corresponds to a portion in direct contact with hardware, it is preferable that the resin has insulating properties. Therefore, it is preferable to use a polyester resin such as polyethylene terephthalate, polybutylene terephthalate, polyethylene naphthalate, polybutylene naphthalate, copolymerized polyester, polycarbonate or a nylon film as a resin used as an outer resin layer.

Specifically, as a polyester resin, polyethylene terephthalate (PET), polybutylene terephthalate (PBT), polyethylene naphthalate (PEN), polybutylene naphthalate (PBN), copolymerized polyester, polycarbonate (PC) etc. are mentioned. As polyester, specifically, copolymerized polyesters having polyethylene terephthalate, polybutylene terephthalate, polyethylene naphthalate, polybutylene naphthalate, polyethylene isophthalate, polycarbonate or ethylene terephthalate as main repeating units, and copolymerized polyester having butylene terephthalate as a main repeating unit and the like may be mentioned. In addition, as a copolymerized polyester having ethylene terephthalate as a main repeating unit, specifically, copolymer polyester having ethylene terephthalate as a main repeating unit and polymerizing with ethylene isophthalate; polyethylene(terephthalate/isophthalate), polyethylene(terephthalate/adipate), polyethylene(terephthalate/sodium sulfoisophthalate), polyethylene(terephthalate/sodium isophthalate), polyethylene(terephthalate/phenyl-dicarboxylate), poly ethylene(terephthalate/decane dicarboxylate) and the like may be mentioned. In addition, as a copolymerized polyester having butylene terephthalate as a main repeating unit, specifically, copolymer polyester having butylene terephthalate as a main repeating unit and polymerizing with butylene isophthalate; polybutylene(terephthalate/adipate), polybutylene(terephthalate/sebacate), polybutylene(terephthalate/decane dicarboxylate), polybutylene naphthalate and the like may be mentioned. These polyesters may be used alone or in combination of two or more.

As a polyamide resin, specifically, aliphatic polyamides such copolymers of nylon 6, nylon 66, nylon 610, nylon 12, nylon 46, nylon 6 and nylon 66; hexamethylenediamine-isophthalic acid-terephthalic acid copolymerized polyamide such as nylon 6I, nylon 6T, nylon 6IT, nylon 6I6T (I represents isophthalic acid, T represents terephthalic acid) containing structural units derived from terephthalic acid and/or isophthalic acid, polyamides containing aromatics such as poly(m-xylylene adipamide) (MXD6); alicyclic polyamides such as polyaminomethylcyclohexyladipamide (PACM6); also, polyamides obtained by copolymerizing isocyanate components such as lactam components and 4,4'-diphenylmethane-diisocyanate, polyester amide copolymer or polyether ester amide copolymer, which is a copolymer of copolymerized polyamide and polyester or polyalkylene ether glycol; copolymers thereof, and the like may be mentioned. These polyamides may be used alone or in combination of two or more.

In the above outer resin layer, it is preferable to use a nylon film as a packaging film for a secondary battery. In the case of the nylon film, it is mainly used as a packaging film because it has excellent tear strength, pinhole resistance, gas barrier property, etc., as well as excellent heat resistance, cold resistance and mechanical strength. Specific examples of the nylon film comprise polyamide resins such as nylon 6, nylon 66, a copolymer of nylon 6 and nylon 66, nylon 610, and poly(m-xylylene adipamide) (MXD6). When the outer resin layer is laminated, the thickness of the laminated outer resin layer is preferably 10 to 30 μm or more, particularly preferably 12 to 25 μm. If the above range is not satisfied, that is, if it is less than 10 μm, the physical properties are deteriorated, thereby easily tearing. In addition, if the range exceeds 30 μm, there is a problem in that moldability is lowered.

First Adhesive Layer

The first adhesive layer is a layer that enhances the adhesion between the outer resin layer and aluminum foil layer. The adhesive layer is formed by an adhesive resin capable of bonding the substrate layer and the metal layer. The adhesive resin used for forming the adhesive layer may be a two-component curing-type adhesive resin or a one-component curing-type adhesive resin. Also, the bonding mechanism of the adhesive resin used to form the adhesive layer is not particularly limited, and may be any of a chemical reaction type, a solvent volatilization type, a thermal melting type, and a hot pressure type. As the resin component of the adhesive resin that can be used for forming the adhesive layer, specifically, polyester-based resins such as polyethylene terephthalate, polybutylene terephthalate, polyethylene naphthalate, polybutylene naphthalate, polyethylene isophthalate, polycarbonate, and copolymerized polyester; polyether-based adhesives; polyurethane-based adhesives; epoxy-based resin; phenol resin-based resins; nylon 6, nylon 66, nylon 12, polyamide-based resins such as copolymerized polyamide; polyolefin-based resins such as polyolefin, acid-modified polyolefin, and metal-modified polyolefin; polyvinyl acetate-based resin; cellulosic adhesives; (meth)acrylic resin; polyimide-based resin; amino resins such as urea resin and melamine resin; rubbers such as chloroprene rubber, nitrile rubber, and styrene-butadiene rubber; silicone-based resins; fluorinated ethylenepropylene copolymer and the like may be mentioned. These adhesive resin components may be used alone or in combination of two or more.

The combination of two or more types of adhesive resin components is not particularly limited, but, for example, as the adhesive resin component, mixed resins of polyamide and acid-modified polyolefin, mixed resins of polyamide and metal-modified polyolefin, mixed resins of polyamide and polyester or polyester and acid-modified polyolefin, mixed resins of polyester and metal-modified polyolefin and the like may be mentioned. Among them, from the viewpoint of excellent malleability and ductility, stress strain inhibition action under high-humidity conditions, thermal degradation inhibition action during heat sealing, etc. and the viewpoint of effectively suppressing the occurrence of delamination by suppressing the decrease in lamination strength between the substrate layer and the metal layer, preferably, polyurethane-based two-component curing-type adhesive resins; polyamides, polyesters, or blend resins of these and modified polyolefins may be mentioned.

The first adhesive layer is a layer that enhances the adhesion between the substrate layer and the aluminum foil layer.

The first adhesive layer is an adhesive used for lamination of a resin film and an aluminum foil, and can be formed using a known material. As the corresponding adhesive, for example, polyurethane-based adhesive which contains a main material comprising a polyol such as polyester polyol, polyether polyol, acrylic polyol, and carbonate polyol, and a curing agent comprising an isocyanate compound having two or more functionalities may be mentioned. The polyurethane-based resin is formed by acting the curing agent on the main material.

First, a polyol may be mentioned as a component of the adhesive.

As the polyol compound used for a urethane-type adhesive, for example, polyester polyol, polyester polyurethane polyol, polyether polyol, polyether polyurethane polyol, etc. may be mentioned. The hydroxyl equivalent and weight average molecular weight of these polyol compounds are not particularly limited as long as they finally satisfy the above physical properties in relation to the isocyanate-based compound to be combined, but, for example, the hydroxyl equivalent weight (number/mol) may be 0.5 to 2.5, preferably 0.7 to 1.9, and the weight average molecular weight may be 500 to 120000, preferably 1000 to 80000. Among these polyol compounds, polyester polyol, polyester polyurethane polyol, and polyether polyurethane polyol may be preferable. These polyol compounds may be used alone or in combination of two or more.

As the polyester polyol, it is possible to use a material obtained by reacting at least one type of polybasic acid and at least one type of diol. As the polybasic acid, dibasic acids, such as aromatic dibasic acids, such as aliphatic dibasic acids such as succinic acid, glutaric acid, adipic acid, pimelic acid, suberic acid, azelaic acid, sebacic acid, and brassylic acid, isophthalic acid, terephthalic acid, naphthalene dicarboxylic acid, etc. may be mentioned.

As the diol, alicyclic diols such as aliphatic diols such as ethylene glycol, propylene glycol, butanediol, neopentyl glycol, methylpentanediol, hexanediol, heptanediol, octanediol, nonanediol, decanediol, and dodecanediol, cyclohexanediol and hydrogenated xylylene glycol, aromatic diols such as xylylene glycol, and the like can be mentioned.

Further, as the polyester polyol, polyester urethane polyols in which the hydroxyl groups at both terminals of the polyester polyol are chain-extended using an adduct body containing an isocyanate compound alone or at least one isocyanate compound, a biuret body or an isocyanurate may be mentioned. As the isocyanate compound, for example, 2,4- or 2,6-tolylene diisocyanate, xylylene isocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate, isopropylidene dicyclohexyl-4,4'-diisocyanate, etc. may be mentioned. As the acrylic polyol, a copolymer containing poly(meth)acrylic acid as a main component may be mentioned. As the corresponding copolymer, materials obtained by copolymerizing hydroxyl group-containing monomers such as 2-hydroxyethyl (meth)acrylate and 2-hydroxypropyl (meth)acrylate; alkyl (meth)acrylate monomers wherein the alkyl group is a methyl group, ethyl group, n-propyl group, i-propyl group, n-butyl group, i-butyl group, t-butyl group, 2-ethylhexyl group or cyclohexyl group; or amide group-containing monomers, such as (meth)acrylamide, N-alkyl (meth)acrylamide, N,N-dialkyl (meth)acrylamide (wherein the alkyl group is methyl, ethyl, n-propyl, i-propyl, n-butyl, i-butyl, t-butyl, 2-ethylhexyl, cyclohexyl or the like), N-alkoxy (meth)acrylamide, N,N-dialkoxy (meth)acrylamide (wherein the alkoxy group is a methoxy group, an ethoxy group, a butoxy group, an isobutoxy group, or the like), N-methylol (meth)acrylamide, and N-phenyl (meth)acrylamide; glycidyl group-containing monomers such as glycidyl (meth)acrylate and allyl glycidyl ether; silane-containing monomers such as (meth)acryloxypropyl trimethoxysilane and (meth)acryloxypropyl triethoxysilane; or isocyanate group-containing monomers such as (meth)acryloxypropyl isocyanate may be mentioned.

As the carbonate polyol, it is possible to use a material obtained by reacting a carbonate compound with a diol. As the carbonate compound, it is possible to use dimethyl carbonate, diphenyl carbonate, ethylene carbonate and the like. As the diol, aliphatic diols such as ethylene glycol, propylene glycol, butanediol, neopentyl glycol, methylpentanediol, hexanediol, heptanediol, octanediol, nonanediol, decanediol, and dodecanediol, cyclohexanediol, alicyclic diols, such as hydrogenated xylylene glycol, and aromatic diols, such as xylylene glycol, etc. may be used. Also, it is possible to use a polycarbonate urethane polyol in which the terminal hydroxyl group of the carbonate polyol is chain-extended with the above-mentioned isocyanate compound.

Next, isocyanate may be mentioned as a component of the adhesive.

As the isocyanate-based compound used in the urethane-type adhesive, for example, polyisocyanate and its adduct bodies, its isocyanurate variants, its carbodiimide variants, its allophanate variants, its biuret variants and the like may be mentioned. As the polyisocyanate, specifically, aromatic diisocyanates such as diphenylmethane diisocyanate (MDI), polyphenylmethane diisocyanate (polymeric MDI), toluene diisocyanate (TDI), hexamethylene diisocyanate (HDI), bis (4-isocyanatecyclohexyl)methane (H12MDI), isophorone diisocyanate (IPDI), 1,5-naphthalene diisocyanate (1,5-NDI), 3,3'-dimethyl-4,4'-diphenylene diisocyanate (TODI) and xylene diisocyanate (XDI); aliphatic diisocyanates such as tramethylene diisocyanate, hexamethylene diisocyanate, trimethylhexamethylene diisocyanate, and isophorone diisocyanate; alicyclic diisocyanates such as 4,4'-methylenebis (cyclohexyl isocyanate) and isophorone diisocyanate, etc. may be mentioned. As the adduct body, specifically, those obtained by adding trimethylolpropane, glycol, or the like to the above polyisocyanate may be mentioned. Among these isocyanate compounds, preferably polyisocyanates and their adduct bodies; more preferably aromatic diisocyanate and its adduct body, and its isocyanurate modified products; more preferably MDI, polymeric MDI, TDI, and their adduct bodies and their isocyanurate variants; particularly preferably, adduct body of MDI, adduct body of TDI, polymeric MDI, and isocyanurate variants of TDI can be mentioned. These isocyanate-based compounds may be used alone or in combination of two or more.

As the isocyanate compound having two or more functional groups used as a curing agent, it is possible to use an isocyanate compound of the kind used as the chain extender, and for example, an isocyanate compound selected from 2,4- or 2,6-tolylene diisocyanate, xylylene isocyanate, 4,4'-diphenylmethane diisocyanate, methylene diisocyanate, isopropylene diisocyanate, lysine diisocyanate, 2,2,4- or 2,4,4-trimethylhexamethylene diisocyanate, 1,6-hexamethylene diisocyanate, methylcyclohexane diisocyanate, isophorone diisocyanate, 4,4'-dicyclohexylmethane diisocyanate, isopropylidene dicyclohexyl-4,4'-diisocyanate, etc. or adduct bodies, biuret bodies, and isocyanurate bodies containing at least one isocyanate compound selected from the above isocyanate compounds may be mentioned.

The blending amount of the curing agent is preferably 1 to 100 parts by mass, more preferably 5 to 50 parts by mass, based on 100 parts by mass of the main material. If the blending amount is less than 1 part by mass, there is a risk that performance may not be expressed in terms of adhesion or electrolyte solution resistance. In addition, if the blending amount is more than 100 parts by mass, excessive isocyanate groups exist, and there is a possibility that the quality of the adhesive film or the hardness may be affected due to the remaining unreacted material.

It is also possible to blend a carbodiimide compound, an oxazoline compound, an epoxy compound, a phosphorus compound, a silane coupling agent, or the like to the polyurethane-based adhesive to promote adhesion.

As the carbodiimide compounds, N,N'-di-o-toluyl carbodiimide, N,N'-diphenyl carbodiimide, N,N'-di-2,6-dimethylphenyl carbodiimide, N,N'-bis(2,6-diisopropylphenyl)carbodiimide, N,N'-dioctyldecyl carbodiimide, N-triyl-N'-cyclohexyl carbodiimide, N,N'-di-2,2-di-t-butylphenyl carbodiimide, N-triyl-N'-phenyl carbodiimide, N,N'-di-p-nitrophenyl carbodiimide, N,N'-di-p-aminophenyl carbodiimide, N,N'-di-p-hydroxyphenyl carbodiimide, N,N'-di-cyclohexyl carbodiimide, N,N'-di-p-toluyl carbodiimide and the like may be mentioned.

As the oxazoline compounds, monooxazoline compounds such as 2-oxazoline, 2-methyl-2-oxazoline, 2-phenyl-2-oxazoline, 2,5-dimethyl-2-oxazoline, and 2,4-diphenyl-2-oxazoline, etc., and dioxazoline compounds such as 2,2'-(1,3-phenylene)-bis(2-oxazoline), 2,2'-(1,2-ethylene)-bis(2-oxazoline), 2,2'-(1,4-butylene)-bis(2-oxazoline) and 2,2'-(1,4-phenylene)-bis(2-oxazoline), etc. may be mentioned.

As the epoxy compounds, diglycidyl ethers of aliphatic diols such as 1,6-hexanediol, neopentyl glycol, and polyalkylene glycol; polyglycidyl ethers of aliphatic polyols such as sorbitol, sorbitan, polyglycerol, pentaerythritol, diglycerol, glycerol, and trimethylolpropane; polyglycidyl ethers of alicyclic polyols such as cyclohexane dimethanol; diglycidyl esters or polyglycidyl esters of aliphatic or aromatic polyhydric carboxylic acids such as terephthalic acid, isophthalic acid, naphthalene dicarboxylic acid, trimellitic acid, adipic acid, and sebacic acid; diglycidyl ethers or polyglycidyl ethers of polyhydric phenols such as resorcinol, bis-(p-hydroxyphenyl)methane, 2,2-bis(p-hydroxyphenyl)propane, tris-(p-hydroxyphenyl)methane and 1,1,2,2-tetrakis(p- hydroxyphenyl)ethane; N-glycidyl derivatives of amines such as N,N'-diglycidylaniline, N,N,N-diglycidyltoluidine and N,N,N',N'-tetraglycidyl-bis-(p-aminophenyl)methane; triglycidyl derivatives of aminophenol; triglycidyltris(2-hydroxyethyl) isocyanurate, triglycidyl isocyanurate, ortho cresol-type epoxy, and phenol novolac-type epoxy resin, etc. may be mentioned.

As the phosphorus compounds, tris(2,4-di-t-butylphenyl) phosphite, tetrakis(2,4-di-t-butylphenyl)-4,4'-biphenylene phosphonite, bis(2,4-di-t-butylphenyl)pentaerythritol-diphosphite, bis(2,6-di-t-butyl-4-methylphenyl)pentaerythritol-di-phosphite, 2,2-methylene bis(4,6-di-t-butylphenyl)octyl phosphite, 4,4'-butylidene-bis(3-methyl-6-t-butylphenyl-di-tridecyl)phosphite, 1,1,3-tris(2-methyl-4-ditridecyl phosphite-5-t-butyl-phenyl)butane, tris(mixed mono- and di-nonylphenyl)phosphite, tris(nonylphenyl)phosphite, and 4,4'-isopropylidene bis(phenyl-dialkyl phosphite), etc. may be mentioned.

As the silane coupling agents, it is possible to use various silane coupling agents such as vinyltriethoxysilane, vinyltris (β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, and N-β-(aminoethyl)-γ-aminopropyltrimethoxysilane.

As an adhesive used for forming an adhesive layer satisfying the physical properties of the packaging film for a secondary battery of the present invention, preferably, a urethane-type adhesive containing at least one polyol compound selected from the group consisting of polyester polyols, polyester polyurethane polyols, polyether polyols, and polyether polyurethane polyols, and at least one isocyanate-based compound selected from the group consisting of aromatic diisocyanates, adduct bodies thereof, and modified isocyanurates thereof; more preferably, a urethane-type adhesive comprising at least one polyol compound selected from the group consisting of polyester polyols, polyester polyurethane polyols, polyether polyols, and polyether polyurethane polyols, and at least one isocyanate-based compound selected from the group consisting of MDI, polymeric MDI, TDI, and adduct bodies thereof and isocyanurate variants thereof may be mentioned.

In addition, in the adhesive containing a polyol compound (main material) and an isocyanate-based compound (curing agent), the ratio of these is appropriately set according to the physical properties to be provided to the adhesive layer, but, for example, the ratio of isocyanate groups in the isocyanate-based compound per 1 mole of hydroxyl groups in the polyol compound may be 1 to 30 moles, preferably 3 to 20 moles.

The first adhesive layer is preferably 2 to 10 $\mu$m and more preferably 3 to 5 $\mu$m in consideration of adhesive properties with the outer resin layer and thickness after molding. If the above range is not satisfied, that is, if the thickness is less than 2 $\mu$m, the adhesive property is lowered. In addition, if the thickness exceeds 10 $\mu$m, there may be a problem that cracks may occur.

Inner Resin Layer

In the aluminum pouch film for a secondary battery of the present invention, the inner resin layer comprises a compound formed by chemically bonding a fluoropolymer resin, a polyolefin, and a functional resin.

The inner resin layer contains a compound formed by chemically bonding 3 to 18% by weight of fluoropolymer resin, 70 to 95% by weight of polyolefin, and 1 to 15% by weight of functional resin, based on the total weight of the inner resin layer.

As the inner resin layer, a resin formed by chemically bonding a fluoropolymer resin entirely dispersed on a base resin may be used.

The fluoropolymer resin may comprise one selected from the group consisting of polyvinyl fluoride, polyvinylidene fluoride, polytrifluoroethylene, polytetrafluoroethylene, and combinations thereof. However, the fluoropolymer resin is not particularly limited thereto as long as it includes a polymer containing fluorine. Specifically, when polyvinyl fluoride is included in the inner resin layer of the present invention, 12 to 18% by weight of polyvinyl fluoride may be contained; when polyvinylidene fluoride is included in the inner resin layer, 9 to 15% by weight of polyvinylidene fluoride may be contained; when polytrifluoroethylene is included in the inner resin layer, 6 to 12% by weight of polytrifluoroethylene may be contained; and when polytetrafluoroethylene is included in the inner resin layer, 3 to 9% by weight of polytetrafluoroethylene may be contained, based on the total weight of the inner resin layer. Since the molar ratio containing the fluorine element is different for each fluoropolymer resin, for example, in the case of poly-tetrafluoroethylene, since it contains a lot of fluorine elements, it can have the same effect even if the content contained in the inner resin layer is reduced compared to polyvinyl fluoride containing relatively small amount of fluorine elements.

The fluoropolymer resin may be entirely dispersed in the inner resin layer to form a chemically bonded compound with a polyolefin and a functional resin. If the fluoropolymer resin forms a chemically bonded compound with a polyolefin and a functional resin, there is an advantage that physical properties such as heat resistance, electrolyte solution resistance, and surface friction coefficient are improved. On the other hand, if the fluoropolymer resin layer is configured to be located separately in the center of the polyolefin layer, fluorine itself is highly likely to migrate, and if it migrates in this way, there may be a problem of contaminating the mold during molding. In the case of the present invention, since the fluoropolymer resin is not contained in the form of a layer, but is dispersed throughout the inner resin layer and chemically bonded with a polyolefin and a functional resin, there is an advantage that the compatibility between the polyolefin and the fluoropolymer resin is high, and thus the probability of migration is lowered. In this specification, the term 'compatibility' is defined as a property that two or more kinds of substances have affinity for each other and form a solution or a homogeneous mixture.

The inner resin layer may include a compound formed by chemically bonding 3 to 18% by weight, preferably 8 to 18% by weight, and more preferably 12 to 18% by weight of a fluoropolymer resin with polyolefin and functional resin, based on the total weight of the inner resin layer. If the content of the fluoropolymer resin is less than 3% by weight, there is a problem that electrolyte solution resistance, releasability and moldability are deteriorated, and if it exceeds 18% by weight, the elongation and toughness of the film are low, making it vulnerable to the stress concentrated on the edge during molding, which causes cracks to occur and thus there is a problem that the moldability is lowered.

The polyolefin may preferably be polyethylene (PE), polypropylene (PP) or a copolymer thereof.

The inner resin layer is not particularly limited thereto and is composed of a resin layer selected from the group consisting of ethylene copolymer, propylene copolymer, polyester-based, polyamide-based, polycarbonate-based, fluorine-based, silicone-based, acrylic-based, ethylene-propylene-diene-monomer rubber (EPDM) and mixtures thereof in addition to polyolefins such as polyethylene, polypropylene, and polybutylene. Preferably, a polyolefin-based resin layer or a mixed resin layer of polybutadiene and polyolefin can be used.

As specific examples of the polyolefin used above, polyethylene such as low-density polyethylene, medium-density polyethylene, high-density polyethylene, and shipboard low-density polyethylene; homopolypropylene, block copolymers of polypropylene (e.g., block copolymers of propylene and ethylene), polypropylene such as random copolymer of polypropylene (e.g., random copolymer of propylene and ethylene); ternary copolymer of ethylene-butene-propylene and the like may be mentioned. Among these polyolefins, preferably, polyethylene and polypropylene may be mentioned.

When polyolefins such as polyethylene or polypropylene or copolymers thereof are used in the inner resin layer, it is preferable because it not only has physical properties required as a packaging material for a secondary battery such as good heat sealability, moisture resistance, and heat resistance, but also has good processability such as lamination. The thickness of the polymer layer in the inner resin layer is preferably 20 to 100 μm, more preferably 30 to 80 μm, in consideration of moldability, insulating properties, and electrolyte solution resistance. If the above range is not satisfied, there may be a problem that moldability, insulation properties and electrolyte solution resistance may be deteriorated.

The inner resin layer may contain a compound formed by chemically bonding polyolefin with a fluoropolymer resin and a functional resin, in an amount of 70 to 95% by weight, preferably 70 to 90% by weight, and more preferably 70 to 85% by weight, based on the total weight of the inner resin layer.

The functional resin may be maleic anhydride polypropylene.

Since the polyolefin and fluoropolymer resin in the inner resin layer of the present invention have low compatibility between resins due to different molecular structures, the functional resin may be comprised to improve compatibility between resins, and through this, compatibility between the polyolefin-based film and the fluoropolymer layer may be improved.

As the functional resin, one selected from the group consisting of modified polyolefin resins may be used. Preferably, as the modified polyolefin resin, maleic anhydride polypropylene (MAHPP), chlorinated polypropylene (Chlorinated PP), epoxide-polypropylene (Epoxide-PP), vinyl maleic anhydride polypropylene (Vinyl-MAHPP), etc. may be used. More preferably, maleic anhydride polypropylene (MAHPP) may be used.

Considering the compatibility between the polyolefin and the fluoropolymer resin, the inner resin layer may contain the compound formed by chemically bonding the functional resin in an amount of 1 to 15% by weight, preferably 3 to 12% by weight based on the total weight of the inner resin layer, with the fluoropolymer resin and the polyolefin. If the content of the functional resin is less than 1% by weight, the compatibility and slip properties of the surface are lowered. In addition, if the content of the functional resin exceeds 15% by weight, there may be a problem that the moldability is lowered.

13

14

Second Adhesive Layer

The second adhesive layer is a layer that enhances the adhesion between the inner resin layer and the aluminum foil layer.

In the aluminum pouch film for a secondary battery of the present invention, as the second adhesive layer, polyurethane, acid-modified polyolefin resin, or epoxy may be used. As specific examples of the second adhesive, maleic anhydride polypropylene (MAHPP) and the like may be mentioned.

As examples of olefin-based resins having the thermal adhesive property, polyethylene, ethylene-α-olefin copolymer, ethylene-acrylic acid copolymer, ethylene-methacrylic acid copolymer, ethylene-acrylic acid ester copolymer, ethylene-methacrylic acid ester copolymer, ethylene-vinyl acetate copolymer, ionomers, polypropylene, maleic anhydride-modified polypropylene, ethylene-propylene copolymer, and propylene-1-butene-ethylene copolymer and the like may be mentioned, and preferably, one or more olefin-based resins selected from the group consisting of polypropylene, ethylene-propylene copolymer, and propylene-1-butene-ethylene copolymer may be comprised.

The acid-modified polyolefin used in the formation of the second adhesive layer is a polymer modified by graft polymerization of polyolefin with unsaturated carboxylic acid. As the acid-modified polyolefin, specifically, polyethylene such as low density polyethylene, medium density polyethylene, high density polyethylene, and linear low density polyethylene; crystalline or amorphous polypropylene such as homo polypropylene, block copolymer of polypropylene (e.g., block copolymer of propylene and ethylene), random copolymer of polypropylene (e.g., random copolymer of propylene and ethylene); ternary copolymer of ethylene-butene-propylene and the like may be mentioned.

Among these polyolefins, in terms of heat resistance, preferably, a polyolefin having at least propylene as a constituting monomer, and more preferably, ternary copolymers of ethylene-butene-propylene and random copolymers of propylene-ethylene may be mentioned. As the unsaturated carboxylic acid used for modification, for example, maleic acid, acrylic acid, itaconic acid, crotonic acid, maleic anhydride, itaconic anhydride and the like can be mentioned. Among these unsaturated carboxylic acids, maleic acid and maleic acid anhydride are preferable. The acid-modified polyolefins may be used alone or in combination of two or more.

The second adhesive layer is preferably 2 to 10 $\mu m$ and more preferably 3 to 5 $\mu m$, in consideration of adhesive properties with the internal layer and thickness after molding. If the above range is not satisfied, that is, if the thickness is less than 2 $\mu m$, adhesive properties are deteriorated. In addition, if the thickness exceeds 5 $\mu m$, there may be a problem that cracks may occur.

When the internal layer and the aluminum layer are laminated on the second adhesive layer, there is no particular limitation, but they may be laminated using a dry lamination method, a heat lamination method, or an extrusion lamination method.

Manufacturing Method of Aluminum Pouch Film for Secondary Battery

The present invention provides a method for manufacturing an aluminum pouch film for a secondary battery comprising the steps of a) preparing an aluminum layer, b) forming an outer resin layer on the first surface of the aluminum layer, c) preparing an inner resin layer containing a compound formed by chemically bonding a fluoropolymer resin, polyolefin, and a functional resin, and d) bonding the inner resin layer to the second surface of the aluminum layer.

a) Step of Preparing Aluminum Layer

As the aluminum layer of the aluminum pouch film for a secondary battery of the present invention, preferably, a soft aluminum foil can be used, and more preferably, in order to further impart pinhole resistance and ductility during cold forming, an aluminum foil containing iron can be used. In the aluminum foil containing iron, the iron content may be preferably 0.1 to 9.0% by mass, more preferably 0.5 to 2.0% by mass, based on the total 100% by mass of the aluminum foil. If the content of iron based on 100% by mass of the aluminum foil is less than 0.1% by mass, the ductility of the aluminum layer is reduced. In addition, if the iron content exceeds 9.0% by mass, there may be a problem that the moldability is deteriorated.

The thickness of the aluminum layer is preferably 10 to 100 $\mu m$, more preferably 30 to 50 $\mu m$, in consideration of pinhole resistance, processability, oxygen and moisture barrier properties, and the like. If the above range is not satisfied, that is, if the thickness is less than 10 $\mu m$, it is easily torn and the electrolyte resistance and insulation properties are deteriorated. In addition, if the thickness exceeds 100 $\mu m$, there is a problem that the moldability is not good.

As the aluminum foil used for the aluminum layer, although untreated aluminum foil may be used, it is more preferable to use an aluminum foil that has been degreased from the point of imparting electrolysis resistance and electrolyte solution resistance. The degreasing treatment method comprises a wet-type and a dry treatment method.

As an example of the wet-type degreasing treatment, acid degreasing or alkali degreasing may be mentioned. As an acid used in the acid degreasing, for example, inorganic acids, such as sulfuric acid, acetic acid, phosphoric acid, and hydrofluoric acid, are mentioned. These acids may be used alone or in combination of two or more.

In addition, in order to improve the etching effect of the aluminum foil, if necessary, various metal salts may be blended. As an alkali used for the alkali degreasing, for example, strong alkalis such as sodium hydroxide may be mentioned, and here it is also possible to use a combination of a weak alkali system or a surfactant.

As an example of the dry-type degreasing treatment, a method of performing a degreasing treatment by a process of annealing aluminum at a high temperature may be mentioned.

b) Step of Forming Outer Resin Layer on First Surface of Aluminum Layer

In the step of forming an outer resin layer on the first surface of the aluminum layer of the aluminum pouch film for a secondary battery of the present invention, a first adhesive layer is applied to the aluminum layer prepared in step a). In this case, the thickness of the applied first adhesive layer is preferably 2 to 10 $\mu m$, more preferably 3 to 5 $\mu m$, in consideration of adhesive properties with the outer resin layer and thickness after molding. If the above range is not satisfied, that is, if the thickness is less than 2 $\mu m$, the adhesive property is deteriorated. In addition, if the thickness exceeds 10 $\mu m$, there may be a problem that cracks may occur.

After the outer resin layer is laminated on the first adhesive layer thus applied, the outer resin layer is formed by laminating using a dry lamination method or an extrusion lamination method. Since the outer resin layer corresponds to a portion in direct contact with hardware, it is preferable that the outer resin layer is a resin having insulating properties. Therefore, as the resin used as the outer resin layer, it is preferable to use a polyester resin such as polyethylene terephthalate, polybutylene terephthalate, polyethylene naphthalate, polybutylene naphthalate, copolymerized polyester, or polycarbonate or use a nylon film, and in particular, it is preferable to use a nylon film. In the case of the nylon film, it has excellent tear strength, pinhole resistance, and gas barrier properties, as well as excellent heat resistance, cold resistance, and mechanical strength, and thus it is mainly used as a packaging film. As specific examples of the nylon film, polyamide resins such as nylon6, nylon66, a copolymer of nylon6 and nylon 66, nylon 610, poly(m-xylylene adipamide) (MXD6), and the like may be mentioned.

When the outer resin layer is laminated, the thickness of the laminated outer resin layer is preferably 10 to 30 $\mu m$ or more, particularly preferably 12 to 25 $\mu m$. If the above range is not satisfied, that is, if the thickness is less than 10 $\mu m$, physical properties are deteriorated, and it is easily torn. In addition, if the thickness exceeds 30 $\mu m$, there is a problem that the moldability is lowered.

When the outer resin layer is laminated, there is no particular limitation, but preferably, the outer resin layer may be laminated by using a dry lamination method or an extrusion lamination method.

c) Step of Preparing Inner Resin Layer Containing Compound Formed by Chemically Bonding Fluoropolymer Resin, Polyolefin, and Functional Resin In step c) above, a resin formed by the fluoropolymer resin being entirely dispersed in the base resin phase and chemically bonded thereto may be prepared as the inner resin layer.

The inner resin layer may contain the compound formed by chemically combining the fluoropolymer resin in an amount of 3 to 18% by weight, preferably 8 to 18% by weight, and more preferably 12 to 18% by weight, based on the total weight of the inner resin layer with the polyolefin and the functional resin. If the content of the fluoropolymer is less than 3% by weight, there is a problem that the electrolyte solution resistance, releasability, and moldability are deteriorated. In addition, if the content of the fluoropolymer exceeds 18% by weight, there is a problem that due to the fluoropolymer, the elongation and toughness of the film are low, thereby making it vulnerable to stress concentrated in the edge portion during molding, which causes cracks to occur, and thus, moldability is lowered.

If the fluoropolymer resin forms a chemically bonded compound with the polyolefin and the functional resin, there is an advantage that physical properties such as heat resistance, electrolyte solution resistance, and surface friction coefficient are improved. On the other hand, if the fluoropolymer resin layer is configured to be located separately, fluorine itself is highly likely to migrate, and if it migrates in this way, there may be a problem of contaminating the mold during molding. In the case of the present invention, since the fluoropolymer resin is not contained in the form of a layer, but is dispersed throughout the inner resin layer and chemically bonded with the polyolefin and the functional resin, there is an advantage that the compatibility between the polyolefin and the fluoropolymer resin is high, and thus the probability of migration is lowered.

Since the polyolefin and fluoropolymer resin in the inner resin layer of the present invention have low compatibility between resins due to different molecular structures, the functional resin may be comprised to improve compatibility between resins, and through this, compatibility between the polyolefin-based film and the fluoropolymer layer may be improved.

As the functional resin, one selected from the group consisting of modified polyolefin resins may be used. Preferably, as the modified polyolefin resin, maleic anhydride polypropylene (MAHPP), chlorinated polypropylene (Chlorinated PP), epoxide-polypropylene (Epoxide-PP), vinyl maleic anhydride polypropylene (Vinyl-MAHPP), etc. may be used. More preferably, maleic anhydride polypropylene (MAHPP) may be used.

Considering the compatibility between the polyolefin and the fluoropolymer resin, the inner resin layer may contain the compound formed by chemically bonding the functional resin in an amount of 1 to 15% by weight, preferably 3 to 12% by weight based on the total weight of the inner resin layer with the fluoropolymer resin and the polyolefin. If the content of the functional resin is less than 1% by weight, the compatibility and slip properties of the surface are lowered. In addition, if the content of the functional resin exceeds 15% by weight, there may be a problem that the moldability is lowered.

d) Step of Adhering Inner Resin Layer to Second Surface of Aluminum Layer

In the step of adhering the inner resin layer to the second surface of the aluminum layer of the aluminum pouch film for a secondary battery of the present invention, polyurethane, acid-modified polyolefin resin, or epoxy may be used as the second adhesive layer for bonding the aluminum layer and the inner resin layer. As a specific example, maleic anhydride polypropylene (MAHPP) may be used.

The second adhesive layer is preferably 2 to 30 $\mu m$, more preferably 3 to 15 $\mu m$, in consideration of adhesive properties with the inner resin layer and thickness after molding. If the above range is not satisfied, that is, if the thickness is less than 2 $\mu m$, the adhesive property is deteriorated. In addition, if the thickness exceeds 30 $\mu m$, there is a problem that cracks may occur.

When the inner resin layer is laminated on the aluminum layer, there is no particular limitation, but preferably, the inner resin layer may be laminated by using a dry lamination method or an extrusion lamination method.

In the above, the preferred embodiments of the present invention have been described in detail, but the scope of the present invention is not limited thereto, and various modifications and improvements made by those skilled in the art using the basic concept of the present invention defined in the following claims also fall within the scope of the present invention.

EXAMPLE: MANUFACTURE OF POUCH FILM

Examples 1-1 to 4-6

In order to laminate the outer resin layer on the first surface of aluminum foil (product by Dongil Aluminum company) having a thickness of 40 $\mu m$, a polyurethane adhesive resin (product by Hi-Chem company) having a thickness of 4 $\mu$m was applied by a gravure roll method, and then a nylon 6 film (product by Hyosung company) having a thickness of 25 $\mu$m was dry-laminated to laminate the nylon film on the aluminum layer. Afterwards, in order to laminate the inner resin layer on the second surface of the aluminum foil, a fluoropolymer resin (F-resin) and a maleic anhydride modified polypropylene (MAHPP, ADMER QE-840, Mitsui chemical company) were mixed in a weight ratio and type shown in Table 1 below and dispersed to the inner resin layer (cast polypropylene, cPP, product by Honam Petrochemical company) using a multi-layer lamination extruder to form a chemical bond and thus to prepare an inner resin layer. The inner resin layer was extruded to a thickness of 40 $\mu$m, and then laminated on aluminum using an adhesive (ADMER) to prepare a pouch film.

TABLE 1

| | | | (Unit: wt %) | |
|---|---|---|---|---|
| | cPP | MAHPP | F-resin | Used F-resin |
| Example 1-1 | 94 | 5 | 1 | Polyvinyl fluoride |
| Example 1-2 | 87 | 10 | 3 | |
| Example 1-3 | 89 | 5 | 6 | |
| Example 1-4 | 81 | 10 | 9 | |
| Example 1-5 | 83 | 5 | 12 | |
| Example 1-6 | 75 | 10 | 15 | |
| Example 2-1 | 94 | 5 | 1 | Polyvinylidene fluoride |
| Example 2-2 | 87 | 10 | 3 | |
| Example 2-3 | 89 | 5 | 6 | |
| Example 2-4 | 81 | 10 | 9 | |
| Example 2-5 | 83 | 5 | 12 | |
| Example 2-6 | 75 | 10 | 15 | |
| Example 3-1 | 94 | 5 | 1 | Polytrifluoroethylene |
| Example 3-2 | 87 | 10 | 3 | |
| Example 3-3 | 89 | 5 | 6 | |
| Example 3-4 | 81 | 10 | 9 | |
| Example 3-5 | 83 | 5 | 12 | |
| Example 3-6 | 75 | 10 | 15 | |
| Example 4-1 | 94 | 5 | 1 | Polytetrafluoroethylene |
| Example 4-2 | 87 | 10 | 3 | |
| Example 4-3 | 89 | 5 | 6 | |
| Example 4-4 | 81 | 10 | 9 | |
| Example 4-5 | 83 | 5 | 12 | |
| Example 4-6 | 75 | 10 | 15 | |

Comparative Example 1

All processes were performed under the same conditions as in Examples 1-1 to 4-6 above, but a pouch film containing only polypropylene in the inner resin layer without a fluoropolymer resin was manufactured.

Comparative Examples 2-1 to 2-4

All processes were performed under the same conditions as in Examples 1-1 to 4-6 above, but the wt % and type of cast polypropylene, maleic anhydride polypropylene, and fluoropolymer resin included in the inner resin layer were as shown in Table 2 below to manufacture the pouch film.

TABLE 2

| | | | (Unit: wt %) | |
|---|---|---|---|---|
| | cPP | MAHPP | F-resin | Used F-resin |
| Comparative Example 1 | 90 | 10 | 0 | — |
| Comparative Example 2-1 | 75 | 5 | 20 | Polyvinyl fluoride |

TABLE 2-continued

| | | | (Unit: wt %) | |
|---|---|---|---|---|
| | cPP | MAHPP | F-resin | Used F-resin |
| Comparative Example 2-2 | 75 | 5 | 20 | Polyvinylidene fluoride |
| Comparative Example 2-3 | 75 | 5 | 20 | Polytrifluoroethylene |
| Comparative Example 2-4 | 75 | 5 | 20 | Polytetrafluoroethylene |

Comparative Example 3

All processes were performed under the same conditions as in Examples 1-1 to 4-6, but a pouch film was manufactured, which contains 'inner resin layer in which a fluoropolymer resin layer is located at the center of the polyolefin layer', instead of 'inner resin layer containing a compound formed by chemically bonding fluoropolymer resin, polyolefin and functional resin'.

Specifically, in order to laminate the inner resin layer on the second surface of aluminum foil, maleic anhydride polyolefin adhesive (product by Hi-Chem company) was applied to a thickness of 5 $\mu$m, and then cast polypropylene (cPP, Honam Petrochemical company) having a thickness of 20 $\mu$m was laminated on aluminum by a dry lamination method. Afterwards, polytetrafluoroethylene (Teflon, DuPont company) having a thickness of 10 $\mu$m was laminated on the cast polypropylene by a dry lamination method, and then maleic anhydride polyolefin adhesive (product by Hi-Chem company) was applied to a thickness of 5 $\mu$m, and cast polypropylene film (cPP, Honam Petrochemical company) having a thickness of 20 $\mu$m, into which 1000 ppm of a slip agent (Dongjin Color Tech, FINA) was added, was laminated by a dry lamination method to manufacture a pouch film of Comparative Example 3.

Experimental Example: Evaluation of Electrolyte Solution Resistance and Moldability (Evaluation of Electrolyte Solution Resistance)

Specimens obtained by cutting the pouch films according to Examples 1-1 to 4-6 and Comparative Examples 1 to 3 into 2 cm×4 cm, respectively, were placed in a test container together with LiPF$_6$ electrolyte solution (product by Lichem company) and sealed, and then such films was heated to 70, 80, 90, and 100 ℃, and after 24 hours, the film was collected, and peeling between the films was observed with the naked eye to evaluate the electrolyte solution resistance, and the results are shown in Table 3 below.

TABLE 3

| | Delamination Temp. (℃) | | | |
|---|---|---|---|---|
| | 70 | 80 | 90 | 100 |
| Example 1-1 | X | X | ○ | ○ |
| Example 1-2 | X | X | ○ | ○ |
| Example 1-3 | X | X | ○ | ○ |
| Example 1-4 | X | X | X | ○ |
| Example 1-5 | X | X | X | X |
| Example 1-6 | X | X | X | X |
| Example 2-1 | X | X | ○ | ○ |
| Example 2-2 | X | X | ○ | ○ |
| Example 2-3 | X | X | X | ○ |
| Example 2-4 | X | X | X | X |
| Example 2-5 | X | X | X | X |

TABLE 3-continued

| | Delamination Temp. (°C) | | | |
| --- | --- | --- | --- | --- |
| | 70 | 80 | 90 | 100 |
| Example 2-6 | X | X | X | X |
| Example 3-1 | X | X | ○ | ○ |
| Example 3-2 | X | X | ○ | ○ |
| Example 3-3 | X | X | X | ○ |
| Example 3-4 | X | X | X | X |
| Example 3-5 | X | X | X | X |
| Example 3-6 | X | X | X | X |
| Example 4-1 | X | X | ○ | ○ |
| Example 4-2 | X | X | X | ○ |
| Example 4-3 | X | X | X | X |
| Example 4-4 | X | X | X | X |
| Example 4-5 | X | X | X | X |
| Example 4-6 | X | X | X | X |
| Comparative Example 1 | ○ | ○ | ○ | ○ |
| Comparative Example 3 | X | ○ | ○ | ○ |

As can be seen in Table 3 above, it was found that in the case of Comparative Examples 1 and 3, as the temperature is increased, the delamination occurred, but in the case of Examples 1-1 to 4-6 containing 3 to 18% by weight of fluoropolymer resin (F-resin), the delamination did not occur well, and thus the electrolyte solution resistance was improved. In particular, it was found that in Examples 1-5 to 1-6, Examples 2-4 to 2-6, Examples 3-4 to 3-6, and Examples 4-3 to 4-6, the electrolyte solution resistance was most improved.

(Evaluation of Moldability)

For the pouch films manufactured in Examples 1-1 to 4-6 and Comparative Examples 1 to 3, they were molded while changing the forming depth by 0.1 mm by a cold drawing punching method (Mold size: 5 cm*6 cm), and whether or not cracks occurred was measured, and the results are shown in Table 4 below.

Whether or not cracks occurred was confirmed by shining light on the molded product in a dark room and observing the light leaking out with a microscope to see whether or not cracks occurred. Through this, the moldability was evaluated by setting the forming depth when cracks did not occur as the limit forming depth.

TABLE 4

| | Limit forming depth mm |
| --- | --- |
| Example 1-1 | 6.9 |
| Example 1-2 | 7.3 |
| Example 1-3 | 7.7 |
| Example 1-4 | 8.0 |
| Example 1-5 | 8.4 |
| Example 1-6 | 8.7 |
| Example 2-1 | 7.4 |
| Example 2-2 | 7.7 |
| Example 2-3 | 8.3 |
| Example 2-4 | 8.5 |
| Example 2-5 | 8.9 |
| Example 2-6 | 8.4 |
| Example 3-1 | 7.9 |
| Example 3-2 | 8.3 |
| Example 3-3 | 8.7 |
| Example 3-4 | 9.0 |
| Example 3-5 | 8.5 |
| Example 3-6 | 8.2 |

TABLE 4-continued

| | Limit forming depth mm |
| --- | --- |
| Example 4-1 | 7.4 |
| Example 4-2 | 7.9 |
| Example 4-3 | 8.5 |
| Example 4-4 | 8.2 |
| Example 4-5 | 7.8 |
| Example 4-6 | 7.0 |
| Comparative Example 1 | 4.0 |
| Comparative Example 2-1 | 4.8 |
| Comparative Example 2-2 | 4.9 |
| Comparative Example 2-3 | 4.7 |
| Comparative Example 2-4 | 4.4 |
| Comparative Example 3 | 4.5 |

As can be seen in Table 4 above, it was found that as the evaluation of the moldability is proceeded, in the case of Examples 1-1 to 4-6 containing 3 to 18% by weight of F-resin, the moldability was improved. In particular, it was found that in the case of Examples 1-6, 2-5, 3-4, and 4-3, the moldability were the most excellent.

The invention claimed is:

1. An aluminum pouch film for a secondary battery, comprising:
an aluminum layer;
an outer resin layer formed on the first surface of the aluminum layer;
a first adhesive layer for bonding the aluminum layer and the outer resin layer;
an inner resin layer formed on the second surface of the aluminum layer; and
a second adhesive layer for bonding the aluminum layer and the inner resin layer,
wherein the inner resin layer comprises a compound formed by chemically bonding a fluoropolymer resin, a polyolefin, and a functional resin, wherein the inner resin layer comprises a compound formed by chemically bonding 3 to 18% by weight of fluoropolymer resin; 70 to 95% by weight of polyolefin; and 1 to 15% by weight of functional resin, based on the total weight of the inner resin layer, wherein the functional resin is a maleic anhydride polypropylene (MAPP).

2. The aluminum pouch film for a secondary battery according to claim 1, wherein the fluoropolymer resin comprises one selected from the group consisting of polyvinyl fluoride, polyvinylidene fluoride, polytrifluoroethylene, polytetrafluoroethylene, and combinations thereof.

3. The aluminum pouch film for a secondary battery according to claim 1, wherein the polyolefin is a polyethylene (PE), a polypropylene (PP), or a copolymer thereof.

4. A method for manufacturing an aluminum pouch film for a secondary battery according to claim 1, comprising the steps of:
a) preparing an aluminum layer;
b) forming an outer resin layer on the first surface of the aluminum layer;
c) preparing an inner resin layer containing a compound formed by chemically bonding a fluoropolymer resin, a polyolefin, and a functional resin; and
d) bonding the inner resin layer to the second surface of the aluminum layer.

* * * * *